United States Patent [19]
Boyle et al.

[11] Patent Number: 5,832,831
[45] Date of Patent: Nov. 10, 1998

[54] FERROMAGNETIC ADHESIVE FOIL FOR PRINTING APPLICATIONS

[75] Inventors: James T. Boyle, North Attleboro; Colin A. Morneau, Braintree, both of Mass.

[73] Assignee: Venture Tape Corp., Rockland, Mass.

[21] Appl. No.: 704,936

[22] Filed: Aug. 30, 1996

[51] Int. Cl.$^6$ .................................. B41N 1/20; B41N 1/22
[52] U.S. Cl. ......................................... 101/375; 101/389.1
[58] Field of Search ................................. 101/389.1, 375, 101/376

[56] References Cited

U.S. PATENT DOCUMENTS

| | | | |
|---|---|---|---|
| 3,742,852 | 7/1973 | Leffler et al. | 101/389.1 |
| 4,046,071 | 9/1977 | Mizuno et al. | 101/395 |
| 4,452,143 | 6/1984 | Heinemann et al. | 101/415.1 |
| 4,574,697 | 3/1986 | Feeley | 101/401.1 |
| 4,684,429 | 8/1987 | Dalton, Jr. | 101/395 |
| 4,932,324 | 6/1990 | Pinkston et al. | 101/486 |
| 5,357,863 | 10/1994 | McLean et al. | 101/389.1 |
| 5,699,956 | 12/1997 | Brennan | 229/92.8 |

FOREIGN PATENT DOCUMENTS

| | | | |
|---|---|---|---|
| 1574908 | 9/1980 | United Kingdom | 101/389.1 |

OTHER PUBLICATIONS

McGraw–Hill Encyclopedia of Science and Technology, vol. 7, p. 126.
McGraw–Hill Encyclopedia of Science and Technology, vol. 10, p. 698.
Bunting Catalog.

*Primary Examiner*—Edgar S. Burr
*Assistant Examiner*—Daniel J. Colilla
*Attorney, Agent, or Firm*—Wolf, Greenfield & Sacks, P.C.

[57] ABSTRACT

A ferromagnetic foil carrying a layer of a pressure sensitive adhesive for adhesive attachment to a printing plate to be used in a letterpress or flexographic printing operation. The ferromagnetic foil preferably is formed of a cold rolled steel having a thickness in the range of from about 0.001 inch to about 0.007 inch. The metal foil allows the printing plate to be adhered to the outer surface of a magnetized printing cylinder due to the magnetic attraction between the printing cylinder and the ferromagnetic foil. If the printing cylinder is not magnetized, but is formed of a ferromagnetic material, a flexible magnetic pad is applied to the outer surface of the cylinder, and the ferromagnetic foil-backed printing plate is then placed on the flexible magnetic pad. If the printing cylinder is formed of a non-ferromagnetic material, a flexible magnetic pad is first adhered to the outer surface of the cylinder, such as by an adhesive, and the foil-backed printing plate is then adhered to the flexible magnetic pad.

11 Claims, 3 Drawing Sheets

FERROMAGNETIC ADHESIVE FOIL FOR PRINTING APPLICATIONS

FIELD OF THE INVENTION

This application relates generally to flexographic, letterpress and other types of printing processes, and more particularly to a ferromagnetic, pressure sensitive adhesive foil for affixing printing plates to printing cylinders.

BACKGROUND OF THE INVENTION

In many types of printing processes, such as letterpress printing and flexography, the image to be transferred to a web is formed on printing plates which are placed in a suitable location on one of a pair of horizontally aligned, rotating printing cylinders. The two cylinders form a nip therebetween through which the web travels. One cylinder contains the printing plates, while the other cylinder assists in feeding sheets of a web, such as paper or cardboard, between the rollers and in applying the necessary pressure to the printing plates to perform the desired printing operation. The printing operation occurs as the cylinder rotates the plate through the nip and presses the plate against the printed web. Typically, the lower cylinder is called the impression cylinder while the upper cylinder is called the plate cylinder and contains the printing plates. In a letterpress operation, the ink typically is transferred from an ink fountain to a form roller through a series of alternating resilient and metal rollers. Ink is then transferred from the form roller to the plates on the plate cylinder. In flexography, ink is transferred from the ink fountain to a knurled cylinder which in turn transfers the ink to the printing plates.

In either letterpress or flexographic printing, the printing plates may be photopolymer plates which are formed of a sheet of polyester containing a layer formed of a photosensitive monomer resin which has been polymerized with ultraviolet light. The printing image is formed on the plate by shining ultraviolet light through a negative which contains the printed image and onto the polyester sheet which contains the non-polymerized photosensitive resin on one surface. The ultraviolet light polymerizes the resin in the areas exposed to the light, or in the areas not blocked by the negative, while the remaining resin on the polyester sheet remains unpolymerized. After the curing process, the non-polymerized resin is removed from the surface of the polyester sheet, and the desired printed image remains in the form of polymerized resin on top of the sheet. Alternatively, lasers can be used to etch the printed image onto the surface of a plate of polyester or molded or sheeted rubber.

These printing plates are attached to the printing cylinder in one of several ways. One manner of attachment involves adhering the plate, to a substrate which is mechanically attached to the printing cylinder. In this process, typically a pressure sensitive adhesive is applied to the backside of the photopolymer plate, such as by the use of a transfer process in which the adhesive is transferred from a roll of pressure sensitive adhesive disposed on a strip of silicon coated, release paper. Placing the adhesive next to the backside of the photopolymer plate allows the adhesive to transfer from the release paper onto the back of the plate. This plate is then placed on the substrate which may be formed of polyester or the like, and is held in place by the pressure sensitive adhesive during adjustment of the plate on the substrate. Once the plate has been placed in the desired location on the substrate, a laminating adhesive is used to permanently bond the plate to the substrate. An axially extending slot on the outer surface of the printing cylinder is adapted to accept a projection or lip on one end of the substrate. This projection or lip on one end is hooked onto the slot, and the substrate is wrapped about the cylinder. The other end of the substrate is affixed to the outer surface of the cylinder through some other means, such as by tape or the like. After the printing process has been completed, the substrate may be removed from the cylinder. However, the printing plate remains affixed to the substrate.

In many instances, the printing cylinder is magnetized, either through the provision of permanent magnet material in the cylinder, or by an electromagnetic charge. In these instances, the printing plate is bonded through the use of a dry laminating adhesive to a relatively rigid, ferromagnetic, metal plate. Typically, this bonding process is accomplished using machinery having a pair of rollers. A laminating adhesive is applied to the backside of the printing plate, and the printing plate and metal plate are passed together through the nip of the rollers to adhere the metal plate to the printing plate. The printing plate is then placed on the magnetized cylinders and is held in place by the electromagnetic attraction. The metal plate typically used for this process is relatively thick, of the order of 0.025 inches in thickness and does not readily bend or allow itself to be molded to the shape of the cylinder. Rather, the metal plate must be shaped through the use of rollers into the configuration of the cylinder. Thus, preparation, affixation and removal of the combined printing and metal plates is time-consuming and difficult. However, these metal plates allow the printing plate to be placed on and removed from any desired location on the cylinder, regardless of the presence or absence of slots or alignment pins.

In the absence of magnetized cylinders, but where the cylinders are formed of steel, or the like, a magnetized vinyl pad may be adhered to the backside of the photopolymer plate using a laminating adhesive. This magnetized vinyl pad typically has a thickness of the order of 0.25 inch and holds the printing plate on the cylinder, allowing placement of the printing plate at any point on the cylinder. In some instances a layer of a magnetized vinyl is placed on the cylinder, and a metal backed printing plate is then placed on the layer of magnetized vinyl.

Where the cylinders are neither magnetized, nor formed of a ferromagnetic metal such as steel, a layer of magnetized vinyl can be wrapped about the cylinder and attached using glue to provide an outer magnetized surface for the attachment of a metal-backed photopolymer printing plate.

Each of the foregoing products has certain drawbacks. The use of a non-metal substrate on which the printing plate is glued is time consuming and permits very little adjustment of the location of the printing plate on the cylinder, once the plate has been permanently affixed to the substrate. Thus, the desired location of the printing plate on the cylinder must be determined with some precision during the affixation of the plate on the substrate at the time the printing plate is prepared. Typically, this process occurs at a point remote from the actual printing cylinders, so that the actual printing environment must be modeled at the shop where the plate is prepared with little room for error. The metal plates which are presently attached to the printing plates for use on magnetized cylinders are relatively rigid and cumbersome to use, and are difficult to mold into the desired configuration for mounting on the cylinder. The process used to affix the metal plate to the printing plate is time consuming expensive.

SUMMARY OF THE INVENTION

The foregoing problems are overcome by the present invention which relates to a thin film ferromagnetic foil with a pressure sensitive adhesive for attachment to a printing plate, and a method of affixing printing plates to a cylinder using such a ferromagnetic, pressure sensitive adhesive foil.

A preferred structure in accordance with this invention includes a foil formed of a ferromagnetic material which is strongly attracted by a magnetic field even in thin sheets. A preferred material is a cold rolled steel foil formed in thicknesses in the range of from about one thousandths to about seven thousandths of an inch. A layer of a pressure sensitive adhesive is applied to one side of the foil, and, prior to use, the pressure sensitive adhesive layer typically is covered by a layer of silicon-coated release paper. In another embodiment, the structure includes a foil layer bonded to a layer of foam and a layer of pressure-sensitive adhesive is disposed on one surface of the foam layer. The foam preferably is a polyethylene foam.

In another aspect of this invention, the foregoing metal foil structure is used in conjunction with printing plates in a letterpress or lexographic printing operation. In a typical operation, after formation of the printing plate, a sheet of the foregoing foil is cut to about the size of the printing plate or a little larger. The printing plate typically is a photopolymer plate or a rubber plate with an etched pattern. The release paper on the cut metal foil is removed, and the metal foil is affixed to the backside of the printing plate. Where electromagnetic or magnetic cylinders are employed, the printing plate is affixed directly to the cylinder by means of the magnetic attraction between the cylinder and the metal foil. Where nonmagnetic, steel cylinders are used, a sheet of magnetized vinyl is placed on the steel cylinder, and the printing plate with the metal foil attached to its backside is placed on the vinyl in the desired location. Where non-ferromagnetic cylinders are used, a sheet of magnetized vinyl can be applied to the cylinder either by gluing or otherwise to provide a magnetized surface to which the metal foil on the printing plate will be attracted.

The use of the metal foil having a layer of pressure sensitive adhesive considerably facilitates the bonding of a metal material backing to the printing plate. No laminating adhesives are required, and no machinery is required to bond the foil to a printing plate. Moreover, the ferromagnetic foil of this invention is much thinner than the metal plates previously used with the printing plates, so that the foil readily conforms to the curved shape of the printing cylinder, and need not be bent into shape prior to affixation. Any air bubbles, or any imperfections in the application of the foil can be fixed simply by pulling the foil off the cylinder and replacing it while smoothing out the wrinkles or air bubbles in the foil. If the printing plate becomes misaligned, it can be readily moved into the desired location. The foil is sufficiently ferromagnetic to provide a desired bond between the printing plate and the cylinder, yet can be quickly removed by peeling it away from the cylinder when necessary. The resulting cost of the printing plate, and thus of the printing operation is significantly reduced.

BRIEF DESCRIPTION OF THE DRAWINGS

The objects, advantages and features of this invention will be more clearly appreciated from the following detailed description, when taken in conjunction with the accompanying drawings, in which.

DETAILED DESCRIPTION

Figure 1:
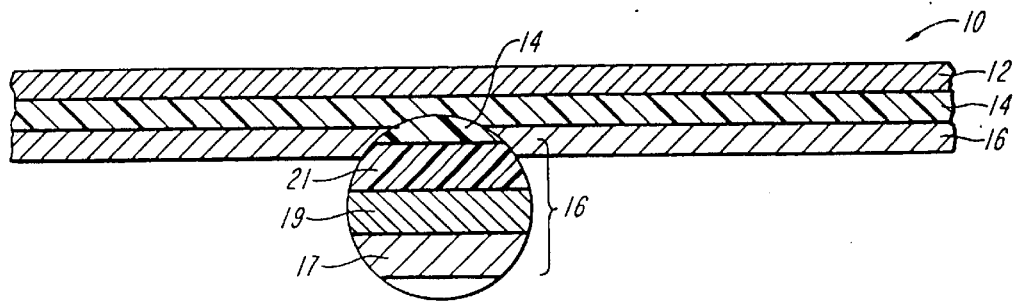
FIG. 1 is a cross-sectional view showing one foil structure according to the present invention.

With reference now to the drawings, and more particularly to FIG. 1 thereof, an exemplary foil structure 10 according to the present invention will now be described. Pressure sensitive adhesive foil 10 includes metal layer 12, adhesive layer 14 and release layer 16.

Foil layer 12 preferably should satisfy four primary requirements to be suitable for use in the application to be described hereinafter. Firstly, foil layer 12 should be formed of a ferromagnetic material which will be attracted to either a permanently magnetized cylinder or an electromagnetic cylinder. Secondly, foil layer 12 should be sufficiently thin that it can be manually manipulated and will readily conform to the shape of the surface to which it is applied without being previously shaped. In other words, foil layer 12 should assume the shape of the surface to which it is attracted solely as a result of the magnetic force applied to it. Thirdly, foil layer 12 should be sufficiently thick or have a sufficient mass that the magnetic force holding it to the underlying printing cylinder is sufficiently strong that layer 12 will not shift during a printing operation. Fourthly, the force holding foil layer 12 to the printing cylinder surface should not be so strong that the printing plate cannot be removed from that surface by manually peeling foil layer 12 off the cylinder surface. In view of the foregoing criteria, it has been determined that a preferred material for foil layer 12 is a low carbon steel foil. A preferred material is a four temper steel containing a maximum of 0.15% carbon, 0.60% manganese, 0.035% sulphur and 0.035% phosphorous, and a minimum of 0.20% copper. (ASTM 109–93). A preferred composition is 0.053% carbon, 0.25% manganese, 0.005% phosphorous and 0.013% sulphur. A typical yield strength is about 39,400 psi, a typical ultimate tensile strength is about 57,800 psi, a typical modulus of elasticity is about 24.01 and a typical hardness is about 58.0 (RB). In this particular alloy, the thickness of layer 12 should be within the range of from about 0.001 inch to about 0.007 inch, with a preferred thickness being about 0.002 inch.

Layer 14 is preferably formed of a pressure sensitive adhesive. A preferred adhesive is a two component, solvent-based adhesive system in which the primary component is an acrylic polymerized from monomers such as methyl methacrylate and butyl methacrylate. However, a low density polyethylene may also be used. Suitable solvents include toluene, isopropanol, heptane, hexane and any other solvent capable of dissolving an acrylic or a polyester. The solvent content typically is in the range of from about 45% to 47%, although higher or lower solvent contents may be used. Adhesive layer 14 may also include plasticizers and tackifiers to increase the adhesion properties. The viscosity of the adhesive may be in the range of from about 1,000 to about 25,000 centipoise at this solvent content, and a preferred range is from about 4,000 to about 10,000 centipoise. The peel adhesion of this adhesive when coated at one mil and tested in accordance with PSTC-1 is between about 3 and about 3.5 pounds per inch. The Williams Plasticity Index typically is between about 2.2 and 2.5 millimeters. A preferred cured thickness for adhesive layer 14 is about 0.0015 inch and a preferred cured coating weight is about 1.19 ounces/yd$^2$. An acceptable, commercially available candidate for adhesive layer 14 is an adhesive such as Polytac 377 brand adhesive produced by H & N Chemical in Totowa, N.J. 07512.

Layer 16 typically is a paper layer which has been coated with a material which will release from the pressure sensitive adhesive. A preferred composition for layer 16 is a layer 21 of kraft paper which has been coated with a layer 19 of polyethylene and a layer 17 of silicon. The preferred weight for layer 21 is about 80 pounds per 3.000 square feet. A preferred coating weight for polyethylene layer 19 is about 316 pounds per 3000 square feet, while a preferred coating weight for silicon layer 17 is about 116 pounds per 3000 square feet. Layer 16 preferably releases easily so that there are no wrinkles in foil layer 12, since wrinkles within the foil could cause air to be trapped during application to a printing plate, as will be discussed. A preferred release is 20 grams per inch. An acceptable, commercially available product for layer 16 is a Ludlow 7013 brand release paper which can be purchased from Ludlow Specialty Papers, Meridian, Miss.

Figure 2:
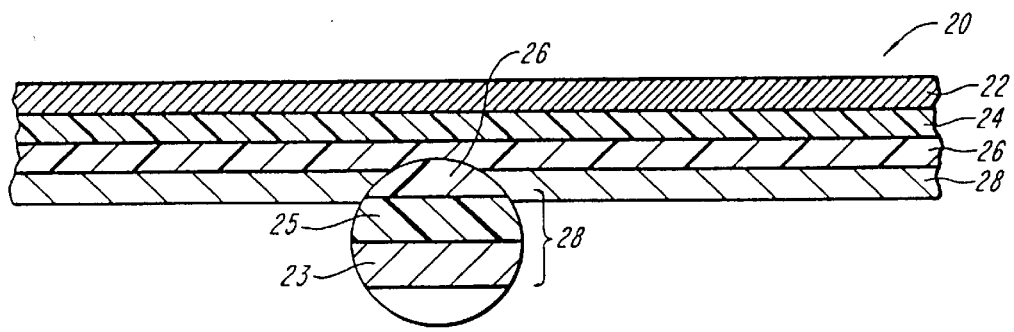
FIG. 2 is a cross-sectional view showing another foil structure according to the present invention.

FIG. 2 illustrates an alternative structure 20 of the present invention. The structure of FIG. 2 would typically be used when more detailed work is being printed which requires some compression in the printing plate. Structure 20 includes a foil layer 22, a foam layer 24, an adhesive layer 26 and a release layer 28. Foil layer 22 is identical in all respects to foil layer 12. Similarly, adhesive layer 24 is identical in all respects to adhesive layer 14.

Foam layer 24 preferably is formed of a closed cell foam. Foam layer 24 should be sufficiently thick to provide additional strength and resilience to structure 20, but should not be so thick that it will not bend readily under the influence of a magnetic force to conform to the shape of the surface to which foil layer 22 is attached. A preferred material for foam layer 24 is a cross-linked polyethylene foam which has a thickness in the range from about 0.015 inch to about 0.0250 inch. Foam layer 24 is laminated to foil layer 22 using a conventional laminating adhesive. While many conventional laminating adhesives would be acceptable, a preferred laminating adhesive comprises a three-part polyurethane adhesive which is formed of urethane, a polyisocyanate cross-linker and a tertiary amide cross linker. Release layer 28 can be formed of any conventional release paper. A preferred release is about 20 grams per inch. A preferred release layer includes a layer 25 of kraft paper and a layer 23 of silicon coating layer 25. Layer 25 preferably has a weight of about 80 pounds per 3000 square feet, while layer 23 has a coating weight of about 116 pounds per 3000 square feet. A commercially acceptable candidate is a Ludlow RR-81 brand release paper available from Ludlow Specialty Papers, Meridian, Miss.

Figure 3:
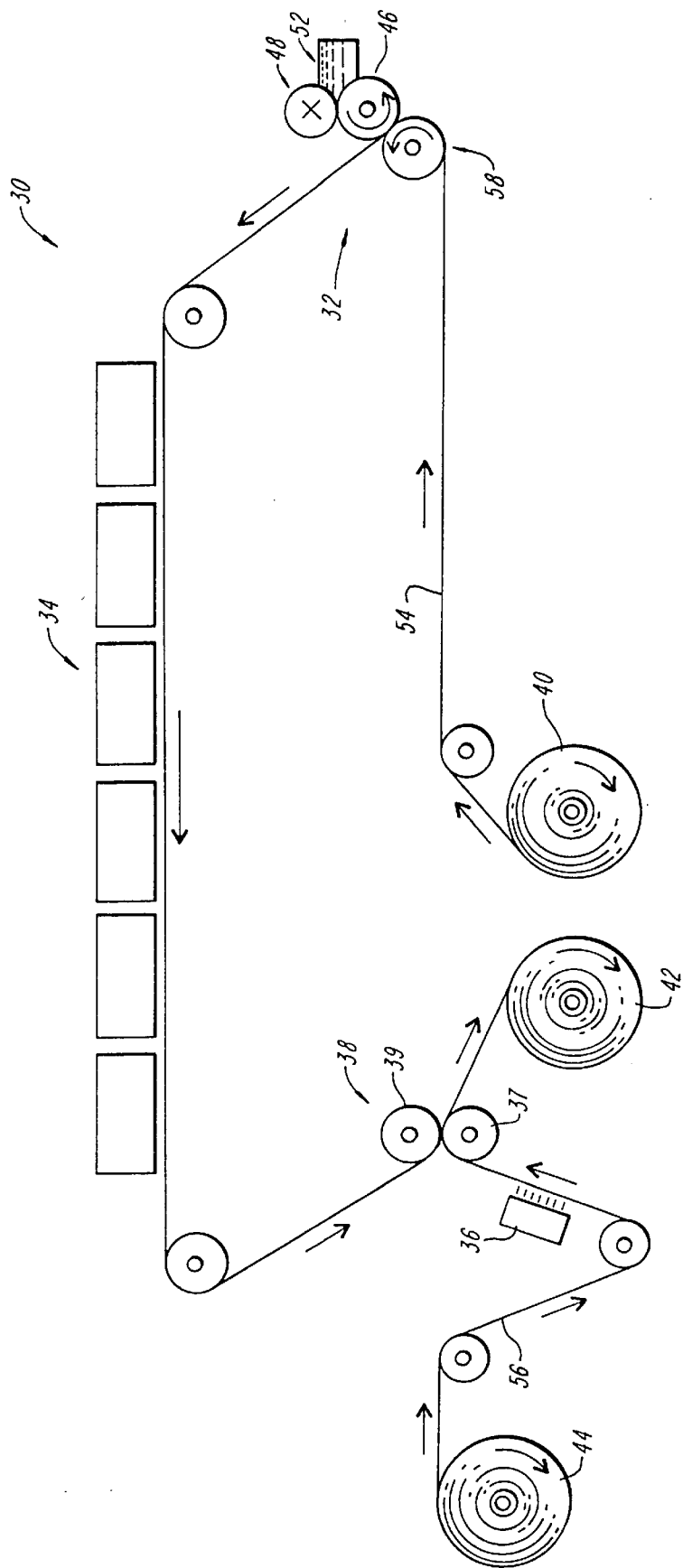
FIG. 3 is a side, schematic view illustrating a method of manufacture of the structure of FIG. 1.

The method and apparatus 30 for forming foil structure 10 of FIG. 1 will now be described with reference to FIG. 3. Coating apparatus 30 includes adhesive application station 32, curing ovens 34, corona treatment station 36, lamination station 38, supply roll 40, takeup roll 42 and supply roll 44. Application station 32 includes rollers 58, 46 and 48, and a container 52 with a supply of adhesive. In operation, release paper layer 54 is supplied from supply roll 40. Release paper layer 54 passes around roller 58 and past roller 46. Roller 48 remains stationary. Roller 46 rotates in a direction such that the upper surface adjacent layer 54 rotates in a direction opposite the direction of movement of layer 54 and in the same direction of rotation as roller 48. In FIG. 3, rollers 46 and 58 rotate in a counterclockwise direction. Roller 46 is spaced from layer 54 and rollers 46 and 58 are spaced from one another. As roller 46 rotates, adhesive is lifted by roller 46 from container 52, metered by roller 48 and carried by roller 46 to layer 54 which is passing between rollers 46 and 58. At this point, the adhesive transfers from roller 46 to layer 54. The spacing between rollers 46 and 48 may be adjusted to adjust the amount of adhesive carried by roller 46 and thus the coating weight of the adhesive applied to layer 54 by roller 46. As a result, the adhesive is uniformly applied along the length and width of layer 54. As can be seen, adhesive is applied to the portion of layer 54 that faces outwardly, or upwardly towards ovens 34. Alternatively, application station 32 may include a knife (not shown) disposed a fixed distance from roller 48 to meter the adhesive onto layer 54. Application station 32 also may be comprised of a slotted extrusion die in which the adhesive is extruded through a slot in a die (not shown) and deposited onto layer 54. In one embodiment, the adhesive is applied with a coating weight of about 2.4 ounces per square yard and a thickness of about 3.0 mils, so that the final, cured coating weight of the adhesive which later becomes adhesive layer 14 of FIG. 1 is about 1.2 ounces per square yard and the cured thickness of the adhesive layer is about 1.5 mils.

The composite of layer 54 and an adhesive is passed through curing ovens 34 which heat the adhesive to a temperature of about 250° F. Curing ovens 34 vaporize the solvents and cure the adhesive in a known manner. The composite of layer 54 and adhesive is then passed through lamination station 38. At the same time, foil 56 is retrieved from supply roll 44. Prior to passing through lamination station 38, preferably although not necessarily, foil 56 is subjected to corona treatment at corona treatment station 36 to improve the adhesion of foil 56 to the adhesive on layer 54. lamination station 38 typically includes rubber coated nip rollers 37 and 39 which laminate foil 56 to the adhesive on layer 54. The pressure produced by rollers 37 and 39 as foil 56 and layer 54 pass through the nip of rollers 37 and 39 activates the pressure sensitive adhesive to bind foil 56 to layer 54. The resulting laminated product is then collected on takeup roll 42. Since no adhesive is exposed, a single sided release layer 54 is sufficient. Thereafter, typically roll 42 is cut into a plurality of narrower rolls of the finished laminate having the desired width. These rolls contain foil structure 10 of FIG. 1.

The structure 20 of FIG. 2 is formed utilizing the same apparatus 30 which is used to form foil structure 10 of FIG. 1. However, two passes through apparatus 30 are required to form the entire structure 20 of FIG. 2. In the first pass through apparatus 30, typically foil layer 22 is bonded to foam layer 24. In this first operation, supply roll 40 may contain either the foam which forms foam layer 24, or it may contain the foil which forms foil layer 22, while supply roll 44 comprises the other of the material which forms foam layer 24 or foil layer 22. Preferably, supply roll 40 contains the material which ultimately forms foam layer 24. Layer 54 in FIG. 3 thus corresponds, in this first pass through apparatus 30, to foam layer 24 and typically supply roll 44 comprises the material which forms foil layer 22. In this operation, at application station 32, a laminating adhesive is applied to one side of layer 54. This laminating adhesive typically is that identified hereinabove, namely a three-part polyurethane adhesive comprised of urethane, a polyisocyanate crosslinker and a tertiary amide crosslinker. This laminating adhesive is also cured in ovens 34 as previously described. In lamination station 38, the material which forms foil layer 22 is then supplied from supply roll 44 and is nipped together through rollers 39 with the material which forms foam layer 24. These two layers are held together by the cured laminating adhesive. Thereafter, this composite of the foam and foil is cumulated on takeup roll 42.

In the next pass through the coating equipment, supply roll 40 supplies a release paper which ultimately becomes layer 28 of structure of FIG. 2. In this pass through apparatus 30, a pressure sensitive adhesive is applied in the same manner as previously described for the structure of FIG. 1. This pressure sensitive adhesive is the same as that described with respect to adhesive layer 14 of FIG. 1. This pressure sensitive adhesive is applied to the release layer at application station 32, as previously described with respect to the structure of FIG. 1, and the combination of the pressure sensitive adhesive and release layer is then passed through curing ovens 34 which cure the adhesive. In this pass through the equipment, the material on supply roll 44 is that previously found on takeup roll 42, namely a composite of the material which forms foam layer 24 laminated with a laminating adhesive to the material which forms foil layer 22. In lamination station 38, the foam side of the composite from supply roll 44 is placed into contact with the pressure sensitive adhesive disposed on the release layer, so that the release layer which forms layer 28 is nipped together through rollers 39 with the material which forms foam layer 24. This combined structure is then accumulated on takeup roll 42. If desired, the foam surface can be corona treated at corona treatment station 36, prior to arriving at the lamination station 38. The material on takeup roll 42 is then sliced into rolls of an appropriate width to form a roll of material having the structure shown in FIG. 2.

Figure 4:
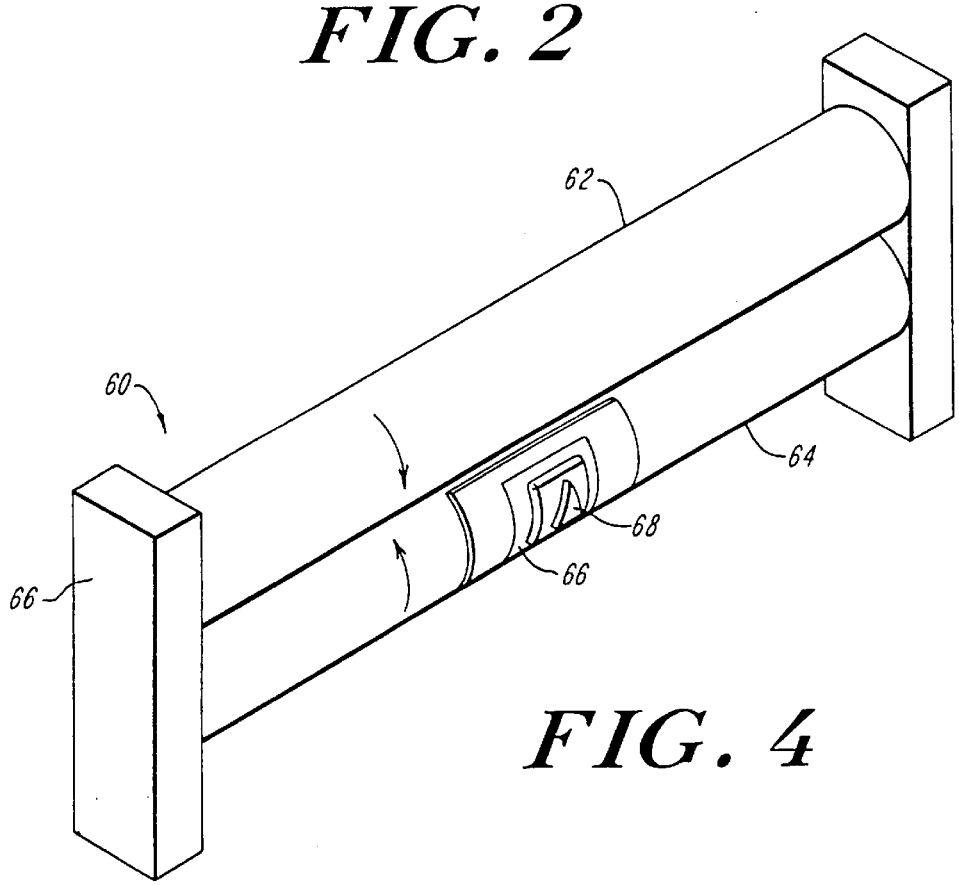
FIG. 4 is a perspective, schematic view illustrating one application of the structure of FIGS. 1 and 2.

The use of the structures of FIGS. 1 and 2 in conjunction with a printing process will now be described with particular reference to FIGS. 4–7. FIG. 4 illustrates schematically a printing apparatus 60 having two cylinders 62 and 64 which are rotated in opposite directions by apparatus 66. It is to be understood that printing apparatus 60 may either be a letterpress apparatus or a flexographic apparatus. Cylinder 64 carries a printing plate 66 and therefore typically is referred to as the plate cylinder. Cylinder 62 typically is referred to as the impression cylinder. While in apparatus 60, the plate cylinder 66 is shown to be the lowermost of the two cylinders, it is to be understood that cylinder 62 could be the plate cylinder, while cylinder 64 could be the impression cylinder. Apparatus 60 is intended to be a conventional letterpress or flexographic apparatus, and its structure and operation are well known to those skilled in the art. The structure and operation of apparatus 60 does not form any part of this invention. If apparatus 60 is a letterpress apparatus, typically ink is transferred to printing plate 66 from an ink fountain (not shown) through a series of alternating resilient and metal rollers to a form roller (not shown) which subsequently transfers ink onto plate 66. If apparatus 60 is a flexographic apparatus, typically ink is transferred from an ink fountain (not shown) through a fountain roller and a knurled cylinder (not shown) to printing plate 66.

Printing plate 66 also is conventional, and its structure and method of preparation also form no part of this invention. In one embodiment, printing plate 66 is a photopolymer printing plate in which a layer of photosensitive resin is placed on top of a polyester sheet. The layer of photosensitive resin is exposed to a source of ultraviolet light which passes through a negative containing the image to be formed on the surface of the polyester sheet. The ultraviolet light cures the resin which it contacts, and allows the other portions of the resin to remain uncured in a semi-liquid or gel-like state. The semi-liquid uncured resin is then removed, and the resulting plate bears the raised image to be printed. Alternatively, printing plate 66 may be a polyester plate, a molded rubber plate, or a sheeted rubber plate onto which the printed image is etched, such as by the use of a laser. In any one of these structures, printing plate 66 has a top surface 68 which contains a raised image to which ink is applied and which is to be printed onto a surface of a web, such as paper, cardboard, plastic film or the like. On the opposite surface of plate 66 is a flat surface 70 which is formed of either polyester or rubber or a like material.

Figure 5:
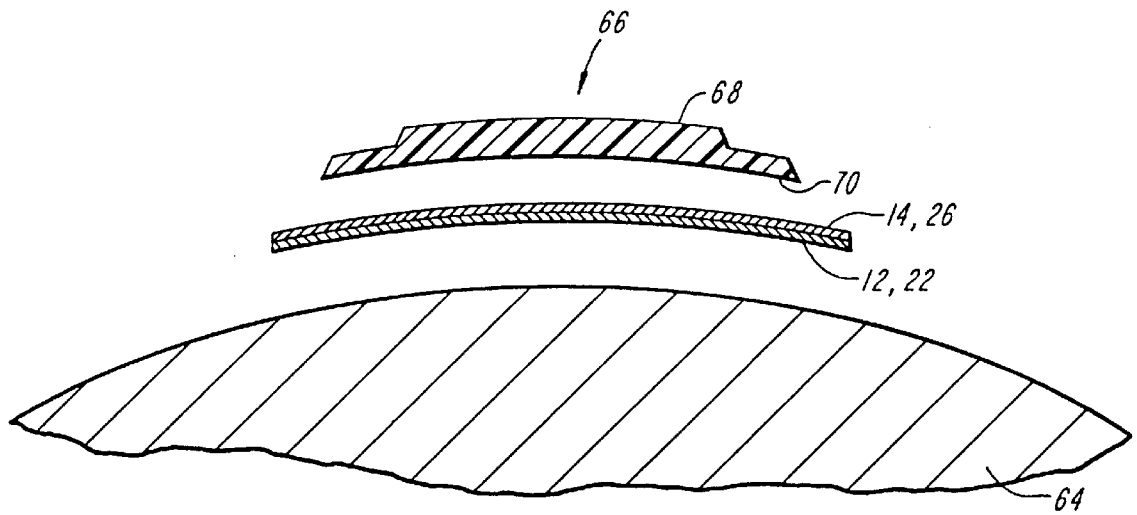
FIG. 5 is a partial, cross-sectional, exploded view illustrating another application of the structure of FIGS. 1 and 2.

When printing plate 66 is used in conjunction with the structure of either FIGS. 1 or 2, a film comprising either structure 10 or structure 20 is cut to have the same shape as surface 70 of printing plate 66. Typically the film of structure 10 or structure 20 is cut so that while it has the same shape as surface 70 of plate 66, it has a dimension slightly larger than the dimensions of surface 70 of plate 66 so that the film of structure 10 or structure 20 extends beyond the edges of surface 70 all around the perimeter of surface 70. The overlap of the film of structure 10 or 20 with respect to surface 70 need not be great, but typically is in the range of from about one eighth to one-half of an inch along each edge. Therefore, if printing plate 66 is, for example, a square plate having a dimension of six inches by six inches, a film of structure 10 or structure 20 typically is cut into a square shape having a dimension roughly six and a quarter inches by six and a quarter inches and surface 70 is centered on the film of structure 10 or 20, so that the film extends beyond each edge of surface 70 by approximately one eighth of an inch. Obviously, the overlap can be greater or lesser than one eighth of an inch. Release paper 16 or 18 is then removed and the film structure is applied directly to surface 70 so that adhesive layer 14 or 26 bonds directly to surface 70. In applying a film of structure 10 or 20 to surface 70, it is important to make certain that the film is not wrinkled and that no air bubbles are trapped between foil 12 or 22 and surface 70. FIG. 5 illustrates in an exploded fashion the resulting structure in which adhesive layer 14 or 26 is bonded directly to surface 70 and in which the film of structure 10 or 20 extends beyond the edges of surface 70.

In a preferred embodiment, cylinder 64 is magnetized, either using an electromagnet, or through the use of permanently magnetized particles embedded in cylinder 64. Suitable cylinders 64 which are either electromagnetically magnetized or permanently magnetized can be purchased from Bunting Magnetics Company, 500 South Spencer Avenue, Newton, Kan. 67114. If cylinder 64 is magnetized, foil layer 12 or 22 will bond directly to the outer surface of cylinder 64, holding plate 66 in position. It is important when applying plate 66 to cylinder 64, that foil 12 or 22 not be wrinkled and that no air bubbles are trapped between foil 12 or 22 and the outer surface of cylinder 64. The magnetic attraction between cylinder 64 and foil 12 or 22 is sufficient to hold printing plate 66 in place during a typical letterpress or flexographic printing operation. Also, since foil 12 or 22 is flexible, it conforms readily to the outer shape of cylinder 64 and the magnetic attraction is sufficient to form it into the same curved configuration as the outer surface of cylinder 64. When it is desired to remove printing plate 66, or move it to a different position, the operator need only peel up one corner of the film of structure 10 or 20 by inserting his or her finger or a sharp edge under the corner. Adhesive layer 14 or 26 tightly bonds foil layer 12 or 22 directly to surface 70 in a permanent fashion which will not delaminate or release during use.

Figure 6:
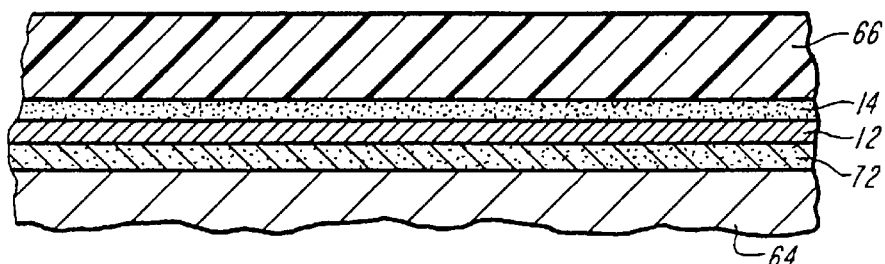
FIG. 6 is a partial, cross-sectional view illustrating another application of the structure of FIGS. 1 and 2.

FIG. 6 illustrates a structure which is used when cylinder 64 is not magnetized, but is formed of steel or some other ferromagnetic material. In the embodiment illustrated in FIG. 6, either structure 10 or 20 of FIGS. 1 or 2 may be utilized. For purposes of illustration only, the embodiment of FIG. 1 is shown. Like numbers are used for like parts. In this embodiment, a sheet of a magnetized vinyl pad 72 is interposed between structure 10 or 20 and the outer surface of printing cylinder 64. Typically, pad 72 has a greater area than that of the film of structure 10 or 20 affixed to printing plate 66, and a greater area than surface 70 of the printing plate 66, so that pad 72 extends beyond the outer edges of surface 70. However, pad 72 may have the same or even a lesser area and thus a lesser dimension than surface 70. The structure of FIG. 6 is identical to that of FIG. 5, except for the provision of pad 72. Pad 72 is magnetically attracted to the outer surface of ferromagnetic printing cylinder 64, and is similarly magnetically attracted to foil layer 12 or 22 of structure 10 or 20. As a result, printing plate 66 is magnetically bonded to the outer surface of printing cylinder 64. Printing plate 66 can be removed or moved in the same manner as illustrated with respect to FIG. 5. Pad 72 may be readily removed from printing cylinder 64 simply by grabbing an edge and peeling it off the cylinder.

In a preferred embodiment, pad 72 is a flexible magnetic sheet which consists of an oriented barium ferrite composite in a thermoplastic binder which may or may not have a laminated vinyl film on one side. A multi-pole magnetization pattern concentrates magnetic strength typically on one face. Preferably, pad 72 has multiple poles along the length of the one face of the sheet on which the magnetic strength is concentrated. However, pad 72 could also have a multiple pole magnetization pattern on both sides such that multiple poles are disposed along both surfaces of the pad. In this embodiment, the magnetic force would be of equal strength on both sides of the pad. Typically, pad 72 is either 0.03 or 0.06 inch in thickness, with the 0.06 inch thickness being preferred. Preferably, there are 14 poles per inch on the surface of pad 72, with the maximum pole strength being about 100 pounds per square foot. A typical weight per foot is about 1.12 pounds per foot for a 24.375 inch width strip. An acceptable, commercially available candidate for pad 72 is a type S flexible magnetic sheet with maximum holding power on one side which is available from Bunting Magnetics Company. 500 South Spencer Avenue, Newton, Kan. 67114.

Figure 7:
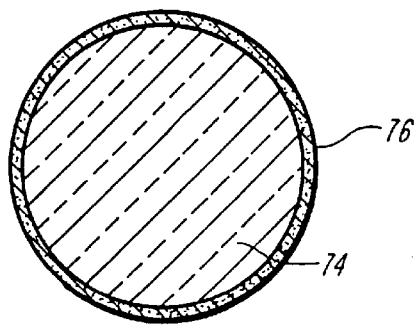
FIG. 7 is a cross-sectional end view of a printing cylinder illustrating another application of the structure of FIGS. 1 and 2.

FIG. 7 illustrates another embodiment of this invention in which printing cylinder 74 is not composed of a ferromagnetic material and is not magnetized. Cylinder 74 may be composed of many materials. including cardboard, an epoxy-wood composite, plastic or a rubberized material. In this embodiment, a magnetized pad 76 which is formed of the same material as pad 72 of FIG. 5, is affixed to the outer surface of cylinder 74. Preferably, pad 76 is affixed to cylinder 74 through the use of an adhesive which permanently bonds pad 76 to cylinder 74. Alternatively, pad 76 may be applied with screws, a pin registration system in which pins are disposed on either cylinder 74 or on pad 76, or by any other conventional means. While FIG. 7 illustrates pad 76 as completely encircling cylinder 74, it is possible for pad 76 to only cover sufficient portions of the outer surface of cylinder 74 to permit placement of the printing plate in the desired location. Typically, however, pad 76 would at least encircle cylinder 74 in the printing location. A suitable adhesive for applying pad 76 to cylinder 74 would include a three-part polyurethane adhesive including urethane, a polyisocyanate crosslinker and a tertiary amide crosslinker. Other acceptable laminating adhesives would include a two component solvent-based adhesive system in which the primary component is an acrylic polymerized from monomers such as methyl methacrylate and butyl methacrylate.

Either structure 10 of FIG. 1 or structure 20 of FIG. 2 may be utilized with the embodiment of FIG. 7. In either case, the structure would be applied to the backside of the printing plate as illustrated in FIG. 5, and the composite of structure 10 or structure 20 and the printing plate would then be applied to pad 76 in the same manner and used in the same manner as with a steel or other ferromagnetic printing cylinder 64.

It will be appreciated that both structure 10 and structure 20 may be provided in a roll, just as with any other pressure sensitive film and may be cut to the desired size using a pair of scissors or the like. The application of a metal backing to a printing plate is thus greatly facilitated, since no laminating equipment is required, and the metal plate need not be preformed into the curved configuration of the printing cylinder. Moreover, the composite of the printing plate and structure 10 or 20 may be readily removed from the printing cylinder, or adjusted with a minimum of effort. Conversely, the structure 10 or 20 holds the printing plate in position on the printing cylinder without any slippage during the printing process. When the printing process has been completed, the printing plate may be removed quickly and either discarded or stored for future printing. The use of this structure decreases the cost of preparation and mounting of printing plates as well as decreases the time required.

Modifications and improvements will occur within the scope of this invention to those skilled in the art, and the above description is intended to be exemplary only. The scope of this invention is defined only by the following claims and their equivalents.

What is claimed is:

1. An adhesive foil comprising:
   a layer of a flexible, steel material having a thickness in the range of from about 0.001 to 0.007 inch, said layer of steel material having a first surface and a second surface;
   a layer of a pressure sensitive adhesive disposed directly on said first surface of said steel layer; and
   a release layer covering said adhesive layer.

2. The adhesive foil as recited in claim 1 wherein said adhesive layer is formed of an adhesive selected from the group consisting of a methyl methacrylate, a butyl methacrylate and a polyethylene.

3. The foil adhesive as recited in claim 1 wherein said steel layer is about 0.002 inch thick.

4. A non-magnetized printing plate for use in flexographic or letterpress printing comprising:
   an upper surface containing an image to be imprinted on a web;
   a support layer disposed below said upper surface;
   a non-magnetized layer formed of a ferromagnetic material having a thickness in the range of from about 0.001 inch to about 0.007 inch; and
   a pressure sensitive adhesive layer securing said ferromagnetic layer to said support layer.

5. A printing structure comprising:
   a magnetized printing cylinder having a magnetic field disposed about an outer surface;
   a printing plate having a lower surface and an upper surface carrying a printing image;
   a layer of a ferromagnetic material disposed between said lower surface of said printing plate and said outer surface of said cylinder, said layer of ferromagnetic material being attached to said outer surface of said cylinder as a result of magnetic attraction between said ferromagnetic material and said cylinder, said layer of ferromagnetic material having a thickness in the range of from about 0.001 inch to about 0.007 inch; and a pressure sensitive adhesive layer binding said lower surface of said printing plate to said layer of ferromagnetic material.

6. A structure for printing an image on a web, said structure comprising:

a non-magnetized cylinder having an outer surface, said cylinder being formed of a ferromagnetic material;

a non-magnetized printing plate having a lower surface and a printing image formed on an upper surface;

a layer of magnetized material disposed between said outer surface of said cylinder and said lower surface of said printing plate; and a ferromagnetic layer disposed between said layer of magnetized material and said lower surface of said printing plate, said ferromagnetic material being directly adhesively secured only to said lower surface of said printing plate, said ferromagnetic layer being sufficiently flexible so as to conform to the size and shape of said outer surface of said cylinder under the influence of said magnetized material and sufficiently thick so as to be held in place by magnetic attraction between said layer of magnetized material and said ferromagnetic layer.

7. A structure for printing an image on a web, said structure comprising:

a non-magnetized printing cylinder formed of a non-ferromagnetic material and having an outer surface;

a layer of magnetized material secured to said outer surface of said cylinder;

a printing plate having an upper surface with an image thereon and a lower surface; and a layer of a ferromagnetic material directly adhesively bonded only to said lower surface of said printing plate, said layer of ferromagnetic material being sufficiently flexible and thin to conform to the size and shape of said outer surface of said cylinder only as a result of a magnetic attraction between said layer of magnetized material and said layer of ferromagnetic material and being sufficiently thick to secure said printing plate to said layer of magnetized material and to resist movement of said printing plate in a direction generally parallel to said outer surface of said cylinder.

8. The structure as recited in claim 7 wherein said layer of ferromagnetic material comprises a layer of a cold rolled steel having a thickness in the range of from about 0.001 inch to about 0.007 inch.

9. The structure as recited in claim 7 wherein said layer of magnetic material comprises an oriented barium ferrite composite disposed in a thermoplastic binder.

10. The structure as recited in claim 7 wherein said layer of ferromagnetic material is bonded to said lower surface of said printing plate by a pressure sensitive adhesive.

11. The structure as recited in claim 7 further comprising a layer of a closed cell foam disposed between said layer of ferromagnetic material and said lower surface of said printing plate.

* * * * *